United States Patent
Grzesik et al.

(10) Patent No.: US 9,285,009 B2
(45) Date of Patent: Mar. 15, 2016

(54) HYDRAULIC SUSPENSION DAMPER AND METHOD OF ASSEMBLING THEREOF

(75) Inventors: Radoslaw Pawel Grzesik, Krakow (PL); Waldemar Widla, Krakow (PL); Marcin Steliga, Krakow (PL)

(73) Assignee: Beijing West Industries Co., Ltd., Beijing (CN)

( * ) Notice: Subject to any disclaimer, the term of this patent is extended or adjusted under 35 U.S.C. 154(b) by 0 days.

(21) Appl. No.: 14/353,161

(22) PCT Filed: Dec. 13, 2011

(86) PCT No.: PCT/CN2011/083892
§ 371 (c)(1),
(2), (4) Date: Apr. 21, 2014

(87) PCT Pub. No.: WO2013/086687
PCT Pub. Date: Jun. 20, 2013

(65) Prior Publication Data
US 2014/0299426 A1    Oct. 9, 2014

(51) Int. Cl.
*F16F 9/348* (2006.01)
*F16F 9/32* (2006.01)

(52) U.S. Cl.
CPC .............. *F16F 9/3488* (2013.01); *F16F 9/3271* (2013.01); *F16F 9/3485* (2013.01); *Y10T 29/49412* (2015.01)

(58) Field of Classification Search
CPC ......... F16F 9/348; F16F 9/3485; F16F 9/512; F16F 9/3488
USPC .................. 188/280, 313, 322.15, 322.22
See application file for complete search history.

(56) References Cited

U.S. PATENT DOCUMENTS

| | | | |
|---|---|---|---|
| 4,203,507 A * | 5/1980 | Tomita et al. | 188/317 |
| 4,362,287 A * | 12/1982 | Grongstad | 248/563 |
| 2004/0163906 A1* | 8/2004 | Gundermann et al. | 188/316 |

(Continued)

FOREIGN PATENT DOCUMENTS

| | | |
|---|---|---|
| CN | 2388413 | 7/2000 |
| DE | 102009054122 A1 | 5/2001 |
| DE | 10258815 | 7/2004 |
| GB | 2314602 | 1/1998 |

(Continued)

OTHER PUBLICATIONS

European Search Report Dated Oct. 5, 2015, 6 Pages.
(Continued)

*Primary Examiner* — Vishal Sahni
(74) *Attorney, Agent, or Firm* — Dickinson Wright PLLC

(57) ABSTRACT

A hydraulic damper includes at least one valve assembly (9, 19) provided with rebound (11, 21) and compression (12, 22) valves and at least one resilient deflective disk covering flow channels (13, 23) of the valve assembly and preloaded by a spring (16, 26). The hydraulic damper includes means for clamping together the components of the at least one valve assembly and for preloading the spring. In order to increase the repeatability coefficient among dampers of the same production batch and render it independent on the geometrical tolerances of the valve assembly components, the means have a form of an adjustable nut assembly (17a, 27a) comprising a clamp nut (171, 271) and a shoulder sleeve (172, 272) fixed on the perimeter of the clamp nut. The clamp nut clamps together the components of the valve assembly and the shoulder sleeve preloads the spring with a predetermined force. method of assembling such a damper.

5 Claims, 4 Drawing Sheets

(56) References Cited

U.S. PATENT DOCUMENTS

| | | |
|---|---|---|
| 2005/0284520 A1* | 12/2005 | Carlstedt et al. ............. 137/493 |
| 2006/0283676 A1* | 12/2006 | Deferme ................. 188/322.13 |
| 2010/0078275 A1* | 4/2010 | Kazmirski et al. ............ 188/280 |
| 2011/0031077 A1* | 2/2011 | Slusarczyk et al. ...... 188/322.15 |
| 2011/0079475 A1* | 4/2011 | Roessle et al. ............. 188/266.5 |
| 2011/0290604 A1* | 12/2011 | Six et al. .................. 188/322.15 |
| 2012/0319804 A1* | 12/2012 | Mahon et al. .............. 333/21 A |

FOREIGN PATENT DOCUMENTS

| | | |
|---|---|---|
| JP | 08177934 | 7/1996 |
| WO | 2011060864 A1 | 5/2011 |

OTHER PUBLICATIONS

International Search Report, Sep. 7, 2012, 3 pages.

\* cited by examiner

HYDRAULIC SUSPENSION DAMPER AND METHOD OF ASSEMBLING THEREOF

CROSS REFERENCE TO RELATED APPLICATION

This application claims the benefit of PCT International Application Ser. No. PCT/CN2011/083892 filed on Dec. 13, 2011, and entitled "Hydraulic Suspension Damper and Method of Assembling Thereof".

TECHNICAL FIELD

The present invention relates to a hydraulic damper, in particular a motor vehicle suspension damper. The Invention relates also to a method of assembling such a damper.

BACKGROUND OF THE INVENTION

Hydraulic suspension dampers typically comprise a tube filled with working liquid, inside of which a slidable piston is placed. The piston is attached to a piston rod led outside the damper through the piston rod guide, and has a form of a piston assembly comprising rebound and compression valves, which control the flow of working liquid passing through the piston during the rebound and the compression stroke of the damper. Twin-tube dampers also comprise a base (bottom) assembly with separate rebound and compression valves controlling the flow of working liquid passing in and out of the compensation chamber formed between the inner and the outer tube of the damper.

Each valve usually comprises a stack of resilient disks, covering the flow passages of the valve assembly, and acts as a one way valve deflecting or moving under the pressure of the working liquid so as to allow its flow. The valves are commonly preloaded with a compression spring usually supported on an additional seat abutting the disks stack of the rebound valve. At the other side the spring abuts a shoulder nut fixed to the piston or the base assembly. A number, shape, diameter, and thickness of each disk, as well as the preload pressure of the spring constitute the parameters used to adjust damping forces.

A damper of this kind is disclosed for example in the European publication EP 2233775 B1.

The shoulder nut is used to clamp all the components of the piston and/or base valve assembly together as well as to preload the compression spring, which by abutting the valve stack creates appropriate damping force dispersion. The assumed preload of the spring is therefore regulated by the assumed working height of the spring. This working height of the spring however does not depend solely on the designed distance between the shoulder nut and the stack of disks but is strongly influenced by the geometrical tolerances of all the elements supporting the spring as well as the spring itself. For example tolerances of the shoulder nut height within a range of +/−0.1 mm, and of the spring seat height within a range of +/−0.1 mm themselves may lead to variations in the spring working height In a range of +/−0.2 mm. Therefore operational characteristics inevitably vary to a large extent among dampers of the same production batch.

SUMMARY OF THE INVENTION

It has been an object of the present invention to provide a hydraulic damper that would enable to achieve comparable working characteristic of all dampers in the line production within a large range of dimensional tolerances of the damper components in order to minimize the production specific losses, decrease the costs of production and increase the result repeatability coefficient.

In order to accomplish the aforementioned and other objects a damper of the kind mentioned in the outset having at least one valve assembly provided with rebound and compression valves which control the flow of working liquid during the rebound and the compression stroke of the damper, wherein said valve assembly comprises at least one resilient deflective disk covering flow channels of said valve assembly, a spring preloading said at least one disk, according to the present invention is provided with means for clamping together the components of said at least one valve assembly and for preloading said spring in a form of an adjustable nut assembly comprising a clamp nut secured to the fixing element of said valve assembly and a shoulder sleeve fixed on the perimeter of the clamp nut, wherein the clamp nut clamps together the components of said valve assembly and said shoulder sleeve preloads said spring with a predetermined force.

Therefore the required spring load is always achieved and is unrelated to any geometrical deviations of the corresponding valve assembly components. This in turn results in achieving the same damping force variations among all dampers of the same production batch.

The invention also provides a method of assembling such a hydraulic damper comprising the steps of
a) clamping axially the components of said valve assembly with the clamp nut securing it to the fixing element of said valve assembly,
b) placing the spring and the shoulder sleeve over the clamp nut,
c) axially displacing the shoulder sleeve to a position in which the pressure of the spring generates the predetermined preload force,
d) fixing the shoulder sleeve to the clamp nut in a position determined in step c).

Said at least one valve assembly is a piston assembly and/or base assembly closing the internal tube at the end opposite to the piston rod.

Preferably said clamp nut is screwed on the fixing element passing axially through said valve assembly and is provided with means for applying the torque. Terms "axial" or "axially" as used herein refer to the damper longitudinal axis.

Preferably said valve assembly additionally comprises an axially displaceable spring seat supporting the spring. Spring seat provides uniform distribution of the spring pressure on the disks stack of the valve assembly.

In such a case said clamp nut has preferably a cylindrical inner section serving as a guide for said spring seat and an outer section which is et least partially wider than the inner section. Wider outer section prevents the spring seat from sliding out after fixing the clamp nut.

Preferably said shoulder sleeve is clamped or the clamp nut forming at least one indent in at least one circular undercut of the shoulder sleeve. It enables for precise displacement of the shoulder sleeve to a position corresponding to the required and measured preload before it is locked in this position.

Alternatively said shoulder sleeve is screwed on the clamp nut and is provided with a locking means to resist loosening under vibrations.

BRIEF DESCRIPTION OF THE DRAWINGS

The invention shall be explained below only in exemplary, embodiments and in connection with the attached drawings on which.

Figure 1:
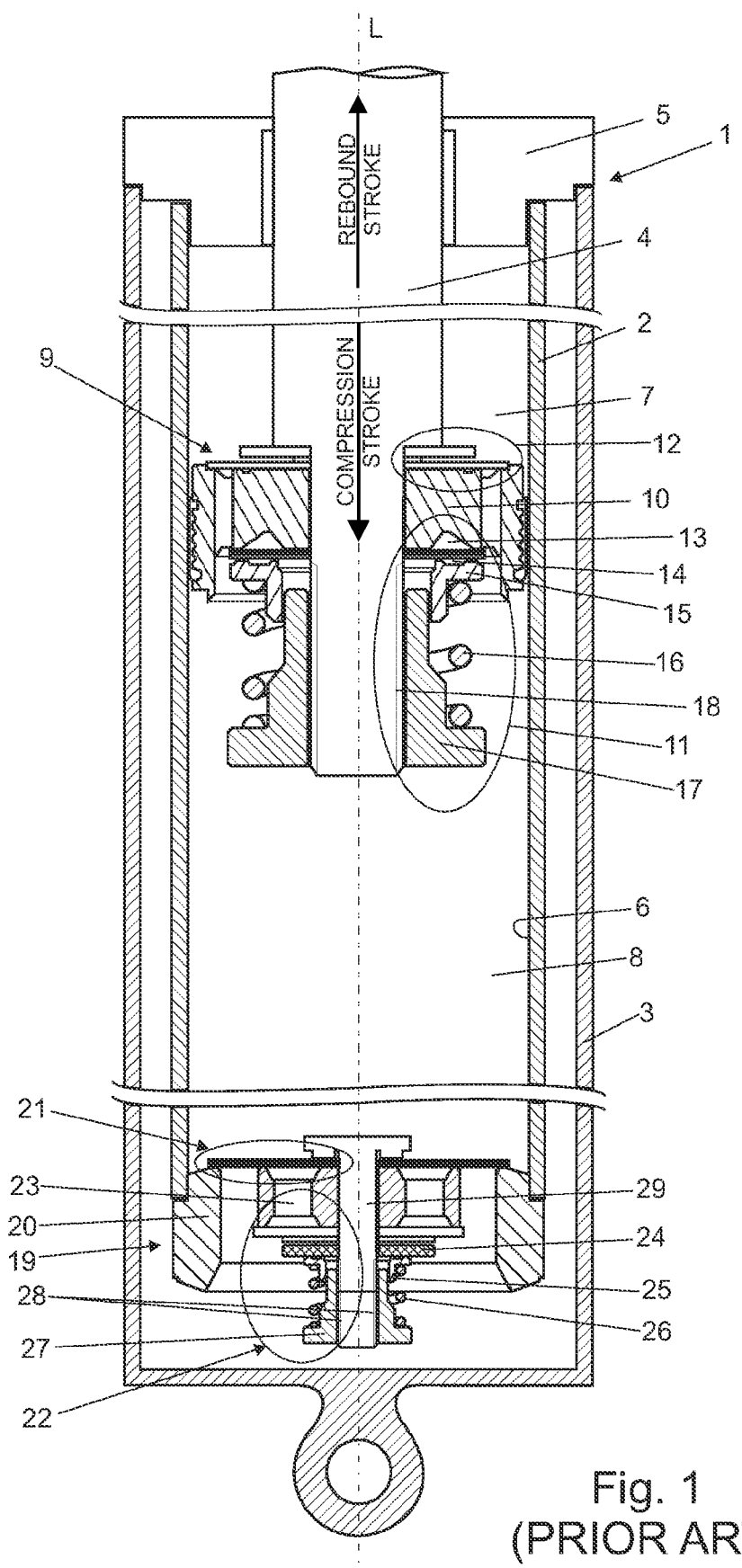
FIG. 1 is a schematic cross-sectional view of a typical twin-tube hydraulic suspension damper.

A hydraulic damper 1 shown in FIG. 1 is an example of a twin-tube damper with tuneable rebound and compression characteristics and commonly used in motor vehicle suspensions. The damper 1 comprises an internal tube 2 and an outer tube 3 filled with working liquid. Inside the tube 2 a movable piston assembly 9 is placed. The piston assembly 9 is attached to a piston rod 4, led axially outside the damper 1 through a sealed piston rod guide 5. The tube 2 is closed at the other end by a base assembly 19. The piston assembly 9 makes a sliding fit with the inner surface 6 of the tube 2 and separates the tube 2 into a rebound chamber 7 and a compression chamber 8. The piston assembly 9 further comprises rebound and compression valves 11 and 12 with appropriate flow channels to control the flow of working liquid passing through the body 10 of the piston assembly 9 during the rebound and the compression stroke of the damper 1 in order to damp reciprocating movement of the piston assembly 9 with the piston rod 4 relative to the tube 2. The piston assembly 9 is secured to the piston rod 4 by a threaded shoulder nut 17, screwed on an external thread 18 of the piston rod 4 end. The rebound valve 11 comprises a stack 14 of resilient deflective discs covering rebound flow channels 13 formed in the piston body 10 and preloaded by a spring 16 arranged between a spring seat 15, contacting the stack 14, and the shoulder nut 17.

The base assembly 19 also comprises rebound and compression valves 21 and 22, with appropriate flow channels to control the flow of working liquid passing through a body 20 of the base assembly during the rebound and the compression stroke of the damper 1. The base assembly 19 is clamped together by a threaded shoulder nut 27, screwed on en external thread 28 of the bolt 29. The compression valve 22 comprises a stack 24 of resilient deflective discs covering flow channels 23 formed in the body 20 and preloaded by a spring 26 arranged between a spring seat 25, contacting the stack 24, and the shoulder nut 27.

The shoulder nuts 17 and 27 not only clamp all the piston and base assemblies components together but also apply required preloads to the valves 11, 21 by fixing the assumed working heights of the springs 16 and 26.

Figure 2:
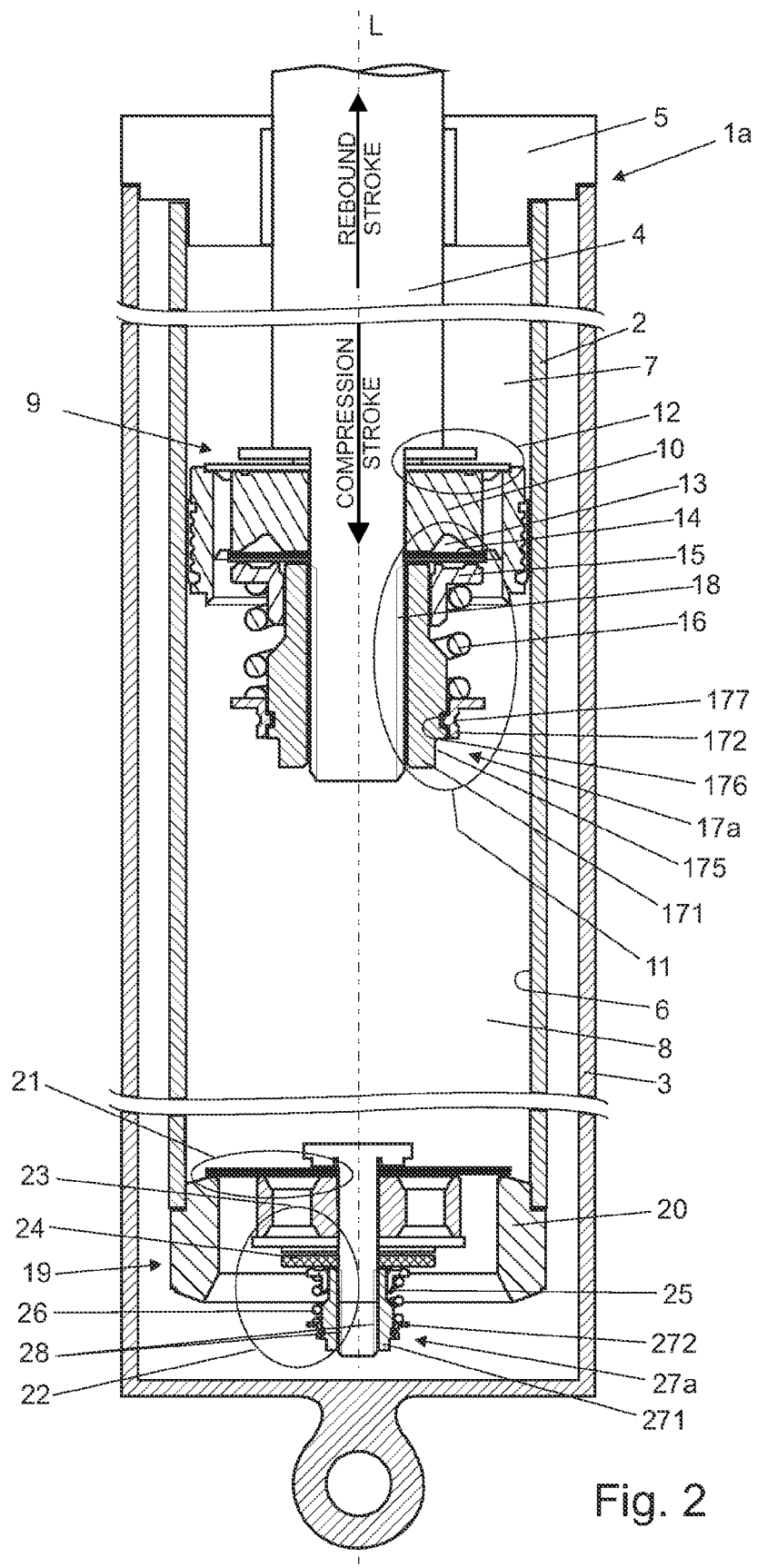
FIG. 2 is a schematic cross-sectional view of a hydraulic damper provided with two adjustable nut assemblies according to the principles of the present invention.

FIG. 2 shows a hydraulic damper 1a provided with two adjustable nut assemblies according to the principles of the present invention. Above and below reference numerals of elements performing the same or similar functions remain the same, as in FIG. 1 wherein suffixes (e.g. 2a) denote variants of the corresponding elements or features (e.g. 2), where appropriate.

As shown, the shoulder nut 17 (cf. FIG. 1) has been replaced by an embodiment of an adjustable nut assembly 17a according to the present invention comprising a clamp nut 171 and a shoulder sleeve 172. The shoulder nut 27 (cf. FIG. 1) has also been replaced by a similar embodiment of an adjustable nut assembly 27a according to the present invention comprising a clamp nut 271 and a shoulder sleeve 272. Construction details of the adjustable nut assemblies 17a and 27a shall be explained later with reference to the adjustable nut assembly 17a of the piston assembly 9 shown in FIGS. 3 and 4.

Figure 3:
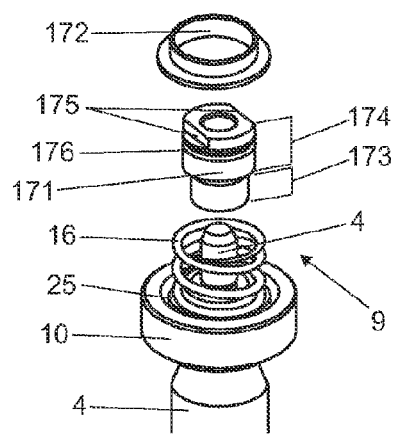
FIG. 3 is an axonometric, exploded view showing the components of the adjustable nut assembly of the piston assembly shown in FIG. 2.

As shown in FIG. 3 the clamp nut 171 of the adjustable nut assembly 17a is provided with an internal thread for screwing on the external thread 18 of the piston rod 4 end and has two substantially cylindrical sections: the inner section 173 and the outer section 174. After screwing with a predetermined torque the nut 171 shall clamp all the components of the piston assembly 9 together. To this end the outer section 174 of the clamp nut 171 is provided with means for applying the torque in the form of two cutouts 175. The diameter of the outer section 174 is also wider than the diameter of the inner section 173, the latter constituting a guide for the spring seat 15 (cf. FIG. 4), so that after screwing the clamp nut 171 on the piston rod 4, the spring seat 15 is unable to accidentally slide out of the nut. The outer section 174 of the clamp nut 171 serves as a fixing guide for the shoulder sleeve 172 and on its perimeter is provided with a circular undercut 176 for fixing the shoulder sleeve 172, FIG. 4 illustrates the method of assembling the damper according to the present invention, and specifically the last stages of assembling the piston assembly 9 provided with the adjustable nut assembly 17a shown in FIGS. 2 and 3.

Figure 4A:
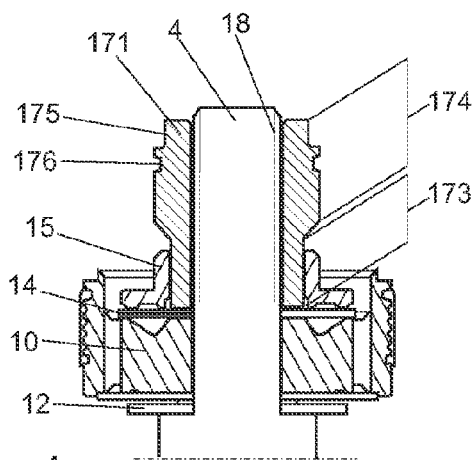
FIG. 4 depicts the consecutive stages of adjusting the spring preload of the adjustable nut assembly shown in FIGS. 2 and 3.

In a stage shown in FIG. 4a the piston assembly 9 components, that is: the compression valve 12, the body 10, the stack 14 of resilient deflective discs and the spring seat 15 have been stacked together and then firmly clamped by the clamp nut 171 screwed on the external thread 18 of the piston rod 4 end with a predefined torque applied by an appropriate tool cooperating with the two cutouts 175 of the outer section 174 of the clamp nut 171.

Figure 4B:
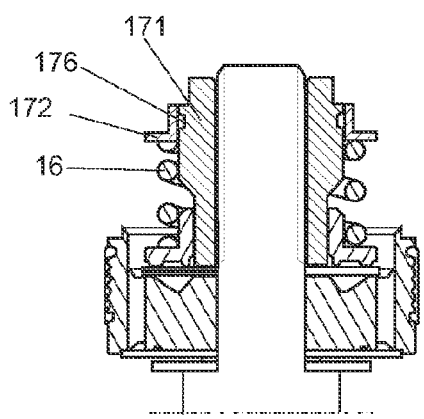
Figure 4C:
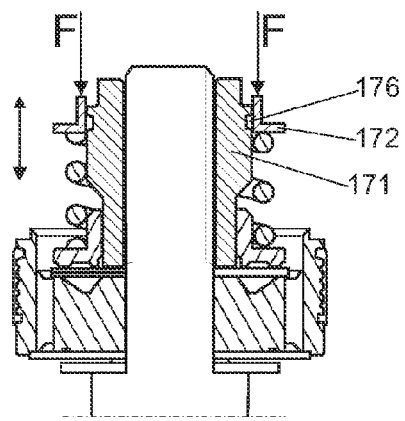

In the subsequent stage shown in FIG. 4b, the compression spring 16 has been slid over the spring seat 15 and over the outer section 174 of the clamp nut 171 and subsequently the shoulder sleeve 172 has been slid over the outer section 174 of the clamp nut 171.

During the next step (FIG. 4c) the spring 16 is preloaded with a predetermined force F operating along the longitudinal axis of the piston rod 4 on the shoulder sleeve 172 by the actuator provided with a force sensor. The aim of this stage is to achieve the designed preload of the spring 16. The spring 16 preload is therefore directly controlled by this force F and not by assumed working height of the spring as in the prior art damper shown in FIG. 1.

Figure 4D:
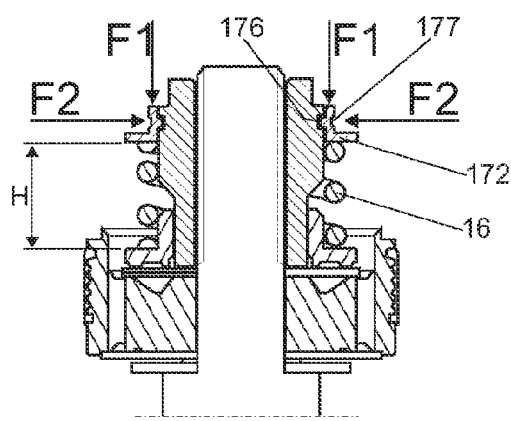

In the last stage of the assembly process presented in FIG. 4d, the position of the shoulder sleeve 172 is secured by clamping the sleeve 172 radially with a force F2 acting in a number of points over its perimeter in order to form indents 177 of the sleeve 172 in the circular undercut 176 of the clamp nut 171. During this stage the assumed axial force F may be slightly increased to a value F1 in order to compensate for the decrease of the shoulder sleeve 172 height during the indentation process.

The similar process is obviously realized while assembling the base assembly 19 of the damper 1a shown in FIG. 2.

Figure 5:
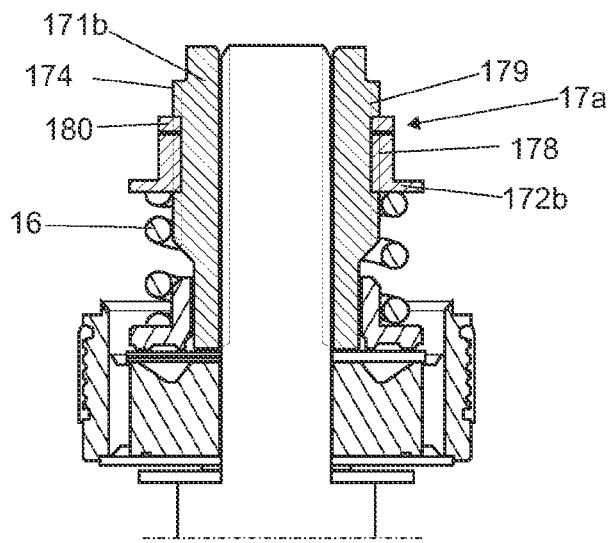
FIG. 5 shows another embodiment of the adjustable nut assembly according to the principles the present invention.

FIG. 5 shows another embodiment of the adjustable nut assembly 17a in which a shoulder sleeve 172b is provided with an internal thread 178 and is screwed on an external thread 179 provided on the circumferential side surface of the outer section 174 of a clamp nut 171b. While screwing the shoulder sleeve 172b on the clamp nut 171 b the reaction force will initially be increasing due to friction forces, up to the point where the thread 178 of the sleeve 172b engages the thread 179 of the clamp nut 171b over its entire length. Then measured reaction force will remain constant up to the point, where the shoulder sleeve 172b abuts the spring 16. Finally the reaction force will be increasing again due to spring reaction enabling to determine the required spring preload position, taking into account the previous constant friction factor.

After achieving this desired preload position, one fixes securely the sleeve 172b to the clamp nut 171b by means of a lock-nut 180 that prevents its loosening under vibrations.

Figure 6:
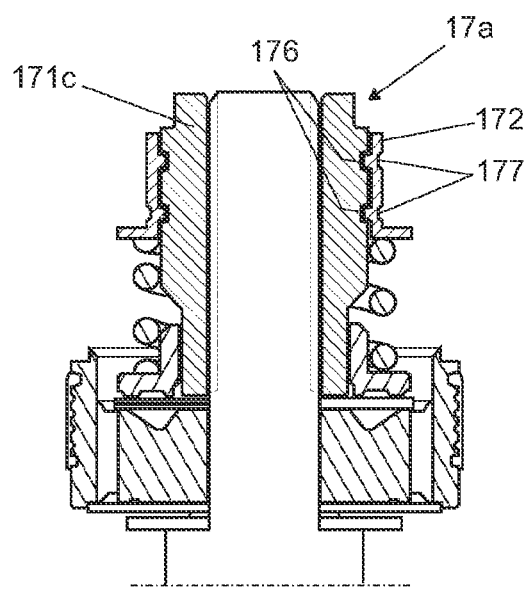
FIG. 6 shows yet another embodiment of the adjustable nut assembly according to the principles of the present invention.

FIG. 6 shows another embodiment of the adjustable nut assembly 17a in which the clamp nut 171c is provided with two circular undercuts 176 to form two circular indents 177 in the shoulder sleeve 172 and thus increase its fixing force.

All the above features ensure that the working characteristic of the valve system remain substantially the same within a large range of dimensional tolerance of its components and even some eccentricity in the axial displacement of the damper components with regard to the damper axis is acceptable. Therefore their production specific losses are minimized and the cost of large scale production of the valve system is substantially decreased.

Although in the above exemplary embodiments the invention has been illustrated with reference to the piston valve assembly 9 and the base valve assembly 19 of twin-tube damper 1a, it may obviously be employed only at the piston valve assembly of mono-tube dampers, such as gas-hydraulic dampers with a floating piston.

Also, as shall be apparent to those skilled in the art, the invention is applicable both at the compression as well as at the rebound side of the piston assembly and the base valve assembly (in case of twin-tube dampers).

The above embodiments of the present invention are therefore merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A hydraulic damper, in particular a motor vehicle suspension damper, comprising:
   at least one tube (2, 3) with working liquid,
   a slidable piston body (10) disposed inside of the internal tube (2) and attached to a piston rod (4) led outside the damper, wherein the flow of the working liquid is controlled within an internal tube (2) of said at least one tube (2, 3) during a rebound and a compression stroke of the piston body (10) by at least one valve assembly (9, 19) provided with rebound (11, 21) and compression (12, 22) valves,
   said at least one valve assembly (9, 19) including at least one resilient deflective disk covering flow channels (13, 23) of said valve assembly (9, 19),
   a spring (16, 26) preloading said at least one resilient deflective disk,
   means for clamping together the components of said at least one valve assembly (9, 19) and for preloading said spring (16, 26),
   said means for clamping together the components of said valve assembly (9, 19) and for preloading the spring (16, 26) including an adjustable nut assembly (17a, 27a) comprising a clamp nut (171, 271) secured to a fixing element (4, 29) of said valve assembly (9, 19) and a shoulder sleeve (172, 272) fixed on a perimeter of the clamp nut (171, 271),
   wherein the clamp nut (171, 271) clamps together the components of said valve assembly (9, 19) and said shoulder sleeve (172, 272) preloads said spring (16, 26) with a predetermined force,
   wherein said valve assembly (9, 19) additionally comprises an axially displaceable spring seat (15, 25) supporting the spring (16, 26), and
   wherein said clamp nut (171, 271) has a cylindrical inner section (173) serving as a guide for said spring seat (15, 25) and an outer section (174) which is at least partially wider than the inner section (13).

2. The hydraulic damper according to claim 1, wherein said at least one valve assembly is a piston assembly (9) and/or base assembly (19) closing the internal tube (2) at an end opposite to the piston rod (4).

3. The hydraulic damper according to claim 1, wherein said clamp nut (171, 271) is screwed on the fixing element (4, 29) passing axially through said valve assembly (9, 19) and is provided with means (175) for applying the torque.

4. The hydraulic damper according to claim 1, wherein said shoulder sleeve (172, 272) is clamped on the clamp nut (171, 271) forming at least one indent (177) in at least one circular undercut (176) of the clamp nut (171, 271).

5. The hydraulic damper according to claim 1, wherein said shoulder sleeve (172b) is screwed on the clamp nut (171b) and is provided with a locking means to resist loosening under vibrations and torque.

* * * * *